(12) United States Patent
Kim

(10) Patent No.: US 9,005,497 B2
(45) Date of Patent: Apr. 14, 2015

(54) MOULDING METHOD FOR RUBBER BLOCKS USING STEAM

(76) Inventor: Ji Hoon Kim, Daegu (KR)

( * ) Notice: Subject to any disclaimer, the term of this patent is extended or adjusted under 35 U.S.C. 154(b) by 0 days.

(21) Appl. No.: 13/816,578

(22) PCT Filed: Aug. 12, 2011

(86) PCT No.: PCT/KR2011/005965
§ 371 (c)(1),
(2), (4) Date: Feb. 12, 2013

(87) PCT Pub. No.: WO2012/021036
PCT Pub. Date: Feb. 16, 2012

(65) Prior Publication Data
US 2013/0134635 A1    May 30, 2013

(30) Foreign Application Priority Data
Aug. 13, 2010  (KR) .......................... 10-2010-0078515

(51) Int. Cl.
| | | |
|---|---|---|
| *B29B 17/04* | (2006.01) | |
| *B29C 35/02* | (2006.01) | |
| *B29B 17/00* | (2006.01) | |
| *B29C 35/04* | (2006.01) | |

(52) U.S. Cl.
CPC ........... *B29C 35/049* (2013.01); *B29B 17/0042* (2013.01); *B29K 2821/00* (2013.01); *Y10S 264/912* (2013.01)

(58) Field of Classification Search
None
See application file for complete search history.

(56) References Cited

U.S. PATENT DOCUMENTS

| 5,151,230 A * | 9/1992 | Damberg .......................... 264/83 |
| 6,579,482 B1 * | 6/2003 | Faust et al. ..................... 264/122 |
| 2012/0326351 A1 * | 12/2012 | Ryan et al. .................... 264/120 |

FOREIGN PATENT DOCUMENTS

| CN | 1054393 A | 9/1991 |
|---|---|---|
| CN | 1515246 A | 2/2005 |
| JP | 09216293 | 8/1997 |
| JP | 2001088154 | 4/2001 |
| KR | 1019930005741 | 4/1993 |
| KR | 200288078 Y1 | 9/2002 |
| KR | 1020080059359 A | 6/2008 |

* cited by examiner

*Primary Examiner* — Mary F Theisen
(74) *Attorney, Agent, or Firm* — Revolution IP, PLLC

(57) ABSTRACT

The present invention relates to a method for molding rubber blocks by combining rubber chips and a urethane binder, and more specifically to a molding method for rubber blocks whereby it is possible to improve the processing time and the physical properties of the product by introducing high-temperature steam during molding. The present invention has advantageous effects in that the molding can take place in a short time without affecting the physical properties of the product even in situations involving heavy molded products, and in that there is no risk of ignition due to self-heating even if the finished products are kept stacked.

4 Claims, No Drawings

MOULDING METHOD FOR RUBBER BLOCKS USING STEAM

TECHNICAL FIELD

The present invention relates to a method for molding rubber blocks by combining rubber chips and urethane binder, and more specifically to a method for molding rubber blocks, which can improve the processing time and the physical properties of the product by injecting high-temperature steam during molding process.

BACKGROUND ART

When producing a block with a molding by using a rubber chip, it is able to mold a product with good physical property within a short time even though using an existing method, since the heat by a heat plate is quickly transferred to a material in a thin product. When molding a thick product, there was a problem that the molding duration gets longer to transfer enough heat into the material. Therefore, a molding method increased the heat of a heat plate has been used to a method of transferring the heat sufficiently into the material within a short time as manufacturing a thick rubber block.

When heating the material with only the heat plate in order to shorten the molding duration, however, a shape is formed but the physical property of the product may be decreased since the surface of the product is excessively vulcanized. In addition, when producing and loading the product in a warehouse, there were still problems of an outbreak of fire due to the self-heating in the product as soon as the product is stacked, or the fire may be slowly started as transferring with using a vehicle.

Therefore, manufacturers had to use a method of molding in low mold temperature for long hours not to affect the physical property of the product when molding the thick block product, thereby increasing the production costs since the vulcanization duration was too long.

DISCLOSURE OF INVENTION

Exemplary embodiments of the present invention overcome the above disadvantages and other disadvantages not described above. An object of the present invention is to provide a method for molding a rubber block in which molding duration is decreased in producing a thick rubber block, the heat is sufficiently transferred into the product, and the finished product does not start the fire for itself.

To achieve the object, the present invention provides a method for molding rubber blocks by combining a rubber chip and urethane binder, the method comprising: vulcanizing the combined material at a mold temperature of 80~160° C. during 2-3 minutes, and vulcanizing the vulcanized material during 3-5 minutes by applying steam of 6-7 ATM.

The rubber chip may be a waste tire chip, a urethane chip or a EPDM chip.

It is advisable that the vulcanization process is repeated consecutively at least twice.

ADVANTAGEOUS EFFECTS

According to the present invention, the present invention has advantageous effects in that the molding can take place in a short time without affecting the physical properties of the product even in a status involving thick molded products, and in that there is no risk of ignition due to self-heating even if the finished products are kept stacked.

BEST MODES FOR CARRYING OUT THE INVENTION

The detail description of the present invention will be explained as follows.

As described above, the present invention provides a method for molding a rubber block by combining a rubber chip and a urethane binder, and the method comprising: vulcanizing the combined material at a mold temperature of 140~160° C. during 2-3 minutes, and vulcanizing the vulcanized material during 3-5 minutes by applying steam of 6-7 ATM.

The rubber chip may be, for example, a waste tire chip, a urethane chip or a EPDM chip.

The inventor(s) of the present invention was created based on the idea that urethane binder used in the present invention is a humidity hardening type.

The thickness of a rubber block is normally 30~200 mm, however, the method of the present invention may be applied regardless of the thickness of the rubber block, but the method of the present invention may effectively apply when molding the rubber block which takes excessively long time with only heat plate, especially when molding the thick rubber block.

The rubber block is a concept including a rubber mat, and the molding method of the present invention may be applied in molding a mat or a block in various shapes such as circular, rectangular, etc.

The preferred example of the molding method of the present invention is as follows.

First, the rubber chip and the urethane binder are combined in relevant proportion and the combined material is vulcanized at a mold temperature of 80~160, more properly of 140~160° C. for 2-3 minutes by heating a heat plate.

Enough heat is not transferred into the product when the temperature is lower than 80° C., and the surface of the product may easily break due to the high temperature when the temperature is higher than 160° C.

Next, after transferring the heat by the heat plate for 2~3 minutes, stream of 6~7 atmospheric pressure is spread consecutively for 3~5 minutes not only to prevent surface damage of the product and to shorten the molding duration since the heat is equally transferred to inside and whole product, but also to prevent the surface over vulcanization which affects the physical property of product, and to decrease the possibility of self-ignition greatly since the product contains moisture after finishing the production.

It is preferred that the process of steam may be in 6~7 of atmospheric pressure for 3~5 minutes and if the process of steam is less than 6 atmospheric pressure or less than 3 minutes, enough heat and moisture may not be transferred into the product, and if the process is more than 7 atmospheric pressure or more than 5 minutes, the molding of surface may be affected negatively.

The method of the present invention may obtain the optimum effect by performing the heating operation by the heat plate and the steam process consecutively, for example, when using the urethane binder used in the present invention, it is important to maintain the mold temperature by the heat plate as described above, since direct contact heat in constant temperature is required and hardening is stimulated by the injection of high temperature steam because the hardening occurs by the moisture in air under proceeding the hardening.

If trying to mold the product with only steam, molding of the product may not be performed properly since the moisture condensation occurs due to the mold without heat, and even the created form may easily break.

In addition, when molding with only the heat plate, 15~20 minutes of molding time is required in producing the rubber block of 50 mm.

Therefore, the method of the present invention is important when molding in the mold temperature and the steam pressure within given time and particularly the method of the present invention may obtain better effect when the steam is not leaking out from the mold.

The process may be performed once, however, it may be performed twice consecutively according to the thickness of the block and types of the rubber chip.

The present invention may be described with more details through following embodiment.

EMBODIMENT

1. Embodiment

A urethane binder of 20 weight % is combined with a waste tire chip of 100 weight %. The mold temperature is maintained in 140° C. by heating the heat plate and the combined material is added and vulcanized for 2 minutes. Then steam of 6 atmospheric pressure is injected to the mold consecutively for 3 minutes. The rubber block is finished by repeating one more process described above.

2. Comparison Example 1

The rubber block is manufactured as the same method as above embodiment except that the steam process is not performed.

3. Comparison Example 2

The rubber block is manufactured as the same method as above embodiment except that only the steam process is performed.

4. Appearance Comparison of Molded Product

Appearance of molded product manufactured from 1~3 described above is observed with the naked eye. In case of the embodiment of the present invention, the molding is complete and the breaking of the surface did not happen, but in cases of comparison examples 1 and 2, there were problems that the molding was incomplete and the surface broke down.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for molding rubber blocks by combining a rubber chip and urethane binder, the method comprising: vulcanizing the combined material at a mold temperature of 140~160° C. during 2-3 minutes, and vulcanizing the vulcanized material during 3-5 minutes by applying steam of 6-7 ATM.

2. The method for molding blocks according to claim 1, wherein the rubber chip is selected one of a waste tire chip, a urethane chip, and a EPDM chip.

3. The method for molding blocks according to claim 1, wherein the two vulcanization processes are repeated at least twice.

4. The method for molding blocks according to claim 2, wherein the two vulcanization processes are repeated at least twice.

* * * * *